United States Patent
Nilsson et al.

(10) Patent No.: US 12,382,406 B2
(45) Date of Patent: Aug. 5, 2025

(54) OVER THE AIR ANTENNA SYNCHRONIZATION IN WIRELESS COMMUNICATION NETWORK

(71) Applicant: Telefonaktiebolaget LM Ericsson (publ), Stockholm (SE)

(72) Inventors: Magnus Nilsson, Lund (SE); Torsten Carlsson, Lund (SE); Magnus Sandgren, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 347 days.

(21) Appl. No.: 17/907,789

(22) PCT Filed: Mar. 2, 2020

(86) PCT No.: PCT/SE2020/050232
§ 371 (c)(1),
(2) Date: Aug. 29, 2022

(87) PCT Pub. No.: WO2021/177866
PCT Pub. Date: Sep. 10, 2021

(65) Prior Publication Data
US 2023/0147008 A1    May 11, 2023

(51) Int. Cl.
*H04W 56/00* (2009.01)
(52) U.S. Cl.
CPC ................. *H04W 56/001* (2013.01)
(58) Field of Classification Search
CPC ....... H04W 56/00; H04W 64/00; H04W 4/02; H04W 4/00; H04W 4/06; H04W 72/00;
(Continued)

(56) References Cited

U.S. PATENT DOCUMENTS

| 6,801,782 B2 * | 10/2004 | McCrady | .............. | G01S 5/0205 |
| | | | | 455/457 |
| 8,355,476 B2 * | 1/2013 | Lee | ....................... | H04J 3/0667 |
| | | | | 375/354 |

(Continued)

FOREIGN PATENT DOCUMENTS

| WO | 2016181197 A1 | 11/2016 |
| WO | 2018232556 A1 | 12/2018 |

(Continued)

OTHER PUBLICATIONS

3rd Generation Partnership Project, "3rd Generation Partnership Project; Technical Specification Group Radio Access Network; Study on NR Industrial Internet of Things (IoT); (Release 16)", Technical Report, 3GPP TR 38.825 V16.0.0, Mar. 1, 2019, pp. 1-33, 3GPP, France.

(Continued)

*Primary Examiner* — Man U Phan
(74) *Attorney, Agent, or Firm* — COATS & BENNETT, PLLC

(57) ABSTRACT

An over the air, OTA, procedure derives a propagation delay (Formula I) of radio signals transmitted between a first radio network node (BS1) and a second radio network node (BS1) operative in a wireless communication system. Using this propagation delay, a two-step synchronization procedure accurately synchronizes, or time-aligns, antennas at the radio network nodes (BS1, BS2) for both transmission and reception. In a first step, each radio network node (BS1, BS2) is accurately calibrated, to obtain a total calibrated delay (Formula II) reflecting the sum of delays through a calibrated receiver path (Formula II) and a calibrated transmitter path (Formula III). In a second step, a pair of radio network nodes (BS1, BS2) separately align their antenna transmit and receive timings in a procedure in which a first (Continued)

radio network node (BS1) is a master and a second radio network node (BS2) is a slave.

22 Claims, 5 Drawing Sheets

(58) Field of Classification Search
CPC ..... H04W 72/04; H04W 76/12; H04W 92/14; H04W 8/00; H04J 3/06; H04L 5/00; H04L 47/28; H04L 5/14; H04L 12/26; H04B 7/06; H04B 7/20; H04B 1/70; G01S 5/02; G01S 5/14; G01S 1/02
USPC .......................................................... 370/350
See application file for complete search history.

(56) References Cited

U.S. PATENT DOCUMENTS

| | | | |
|---|---|---|---|
| 10,321,424 B2* | 6/2019 | Zhang | H04L 5/1469 |
| 10,470,145 B1* | 11/2019 | Rausch | H04H 20/86 |
| 11,129,127 B2* | 9/2021 | Soriaga | G01S 5/0242 |
| 11,438,079 B2* | 9/2022 | Yu | H04W 88/085 |
| 11,490,354 B2* | 11/2022 | Soriaga | H04W 4/029 |
| 11,997,628 B2* | 5/2024 | Keskitalo | H04W 56/0045 |
| 2001/0053699 A1 | 12/2001 | McCrady et al. | |
| 2002/0065089 A1 | 5/2002 | Soliman | |
| 2002/0155845 A1* | 10/2002 | Martorana | H04W 64/00 455/456.1 |
| 2005/0159914 A1 | 7/2005 | Sunden et al. | |
| 2005/0280578 A1 | 12/2005 | Boyd | |
| 2008/0273521 A1 | 11/2008 | Shao et al. | |
| 2010/0315998 A1 | 12/2010 | Tomita et al. | |
| 2011/0002311 A1 | 1/2011 | Wang et al. | |
| 2014/0119462 A1 | 5/2014 | Wei et al. | |
| 2014/0242914 A1* | 8/2014 | Monroe | H04B 17/21 455/63.4 |
| 2018/0132199 A1 | 5/2018 | Zhang et al. | |
| 2019/0110266 A1 | 4/2019 | Abedini et al. | |
| 2020/0229126 A1* | 7/2020 | Soriaga | G01S 5/10 |
| 2021/0223354 A1* | 7/2021 | Breuer | G01S 5/02216 |
| 2023/0072917 A1* | 3/2023 | Lindqvist | H04W 56/0015 |

FOREIGN PATENT DOCUMENTS

| | | |
|---|---|---|
| WO | 2019076513 A1 | 4/2019 |
| WO | 2019122080 A1 | 6/2019 |

OTHER PUBLICATIONS

3rd Generation Partnership Project, "3rd Generation Partnership Project; Technical Specification Group Radio Access Network; Study on New Radio (NR) Access Technology Physical Layer Aspects", Draft 3GPP TR 38.802 V0.3.0, Oct. 1, 2016, pp. 1-43, R1-1610848, 3GPP, https://www.3gpp.org/ftp/TSG_RAN/WG1_RL1/TSGR1_86b/Docs/.

3rd Generation Partnership Project, "3rd Generation Partnership Project; Technical Specification Group Radio Access Network; Study on New Radio (NR) Access Technology Physical Layer Aspects; (Release 14)", 3GPP TR 38.802 V0.3.0, Oct. 1, 2016, pp. 1-43, 3GPP.

CATT, "[Draft] New WID on NR Network Synchronization", 3GPP TSG RAN Meeting #85, Newport Beach, USA, Sep. 16, 2019, pp. 1-5, RP-191981, 3GPP.

Zte et al., "Summary of email discussion on case-1 timing after RAN1 #98", 3GPP TSG RAN WG1 Meeting #98bis, Chongqing, China, Oct. 14, 2019, pp. 1-9, R1-19xxxxx, 3GPP.

China Academy of Telecommunications Technology (CATT), "Motivation of new work item: NR Network Synchronization in Rel-17", 3GPP TSG RAN WG Meeting #85, Newport Beach, USA, Sep. 16, 2019, pp. 1-9, RP-191980, 3GPP.

Jian, X. et al., "A Framework for Over-the-air Reciprocity Calibration for TDD Massive MIMO Systems", IEEE publication draft, Oct. 30, 2017, pp. 1-15, arXiv:1710.10830v1 [cs.IT], IEEE.

* cited by examiner

OVER THE AIR ANTENNA SYNCHRONIZATION IN WIRELESS COMMUNICATION NETWORK

TECHNICAL FIELD

The present invention relates generally to wireless communications, and in particular a system and method of synchronizing antennas of different radio network nodes in a wireless communication network.

BACKGROUND

Wireless communication networks, which transmit Radio Frequency (RF) communication signals between fixed radio network nodes (referred to as base stations) and fixed or mobile radio network nodes (referred to as User Equipment or UE), are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation of network standards has been deployed (4G, also known as Long Term Evolution, or LTE), and the fifth generation is in development (5G, also known as New Radio, or NR).

5G is not yet fully defined, but in an advanced draft stage within the Third Generation Partnership Project (3GPP). 5G wireless access will be realized by the evolution of LTE for existing spectrum, in combination with new radio access technologies that primarily target new spectrum. Thus, it includes work on a 5G NR Access Technology, also known as next generation (NX). A general description of the agreements on 5G NR Access Technology so far is contained in 3GPP TR 38.802 V0.3.0 (2016-10), of which a draft version has been published as R1-1610848. Final specifications may be published inter alia in the future 3GPP TS 38.2** series.

One of the technologies being developed to improve the 5G system performance is the Advanced Antenna System (AAS). AAS employs advanced beamforming and multi-antenna (Multiple Input, Multiple Output, or MIMO) techniques, which improve end-user experience, capacity, and coverage. MIMO techniques include spatial diversity and spatial multiplexing. Spatial diversity refers to transmitting the same signal on different propagations paths (e.g., different transmit/receive antennas), which increases robustness against fading, co-channel interference, and other deleterious effects of RF signal transmission. Spatial multiplexing also uses multiple transmit and receive antennas, and refers to transmitting different portions of data on different propagation paths, using space-time coding, to increase data rates.

Beamforming refers to the use of antennas having increased and controllable directionality, whereby an RF transmission is narrow, and is "aimed" in a specific direction. This may be accomplished by the use of a phased-array antenna comprising a large plurality of antenna elements. The relative phases of transmit signals sent to each antenna element are controlled to create constructive additions in wanted directions and constructive rejection in unwanted directions, and hence controlling the direction in which the beam is transmitted. Similar phase manipulation of signals from antenna elements in a receive antenna can also result in beamforming the sensitivity of a phased-array antenna in receiving signals.

The NR air interface targets spectrum in the range from below 1 GHz up to 100 GHz, with initial deployments expected in frequency bands not utilized by LTE. The trend is that the bandwidth of each defined operating band will scale with the carrier frequency. For example, a bandwidth as high as several GHz will be common for bands in the 24-43 GHz frequency range.

Systems operating in the 24-43 GHz frequency range will be deployed in dense populated areas at street level. This is because operations at these high frequencies will require more densely placed base stations, due to poor radio propagation and technology limitations. To connect all of these base stations to the Internet, a backhaul is required. A wireless backhaul using the same frequency band as that used for access is a cost-effective solution. This is called Integrated Access & Backhaul (IAB).

5G also targets indoor and industrial applications. In these applications, ascertaining the position of a mobile network node (a feature known as positioning) is an important feature, since the indoor coverage of satellite-based positioning systems is poor.

When using IAB to provide backhaul to adjacent base stations, all base stations should be synchronized. Without synchronization, a large amount of interference is generated, particularly in Time Division Duplex (TDD) implementations. In addition, if soft-handover to be used, the base stations involved must be time aligned. If IAB with multiple hops is used, the synchronization requirement for each hop is only a fraction of the overall synchronization requirement.

Observed Time Difference of Arrival (OTDOA) is one positioning option supported by 4G and 5G systems. The OTDOA positioning can be up-link (UL) or down-link (DL) based, but in either case the accuracy is lower bounded by the timing error between the base stations involved. Uncompensated timing errors also limit ranging, and positioning methods based on Round Trip Time (RTT) approaches.

Support for NR Industrial Internet of Things (IoT) and Time Sensitive Networking (TSN) require accurate reference timing delivery, such as by Over the Air Synchronization (OTA-S). OTA-S must be a small fraction (not yet defined in 3GPP) of a complete end-to-end budget, between an Industrial Grand Master clock and a TSN end device, of 1 us. Hence, a stricter OTA-S will be needed than that allowed by current radio access protocols and techniques. See 3GPP TS 38.825.

Various forms of coordinated communication services targeting higher frequencies, which are currently being proposed in 3GPP, Rel 17 (>52.6 GHz) and again in 6G, could require the use of shorter cyclic prefixes (CP) which have higher synchronization requirements.

Also, coherent reception/transmission for distributed MIMO (D-MIMO) could require even stricter synchronization.

Accordingly, there exists a need, particularly in 5G systems, for very accurate synchronization between adjacent base stations or distributed base stations, and between base stations and UEs.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention disclosed and claimed herein, an over the air (OTA) procedure derives a propagation delay (tar) of radio signals transmitted between two radio network nodes in a wireless communication system. The propagation delay is utilized in a two-step synchronization procedure to accurately synchronize, or time-align, antennas of the pair of radio network nodes for both transmission and reception. In a first step, each radio network node is accurately calibrated, to obtain a total calibrated delay reflecting the sum of delays through a calibrated receiver path and a calibrated transmitter path. In a second step, the pair of radio network nodes separately align their antenna transmit and receive timings in a procedure in which a first radio network node is a master and a second radio network node is a slave. The first node transmits a reference signal to the second node, and saves a timestamp indicating the time of transmission of the reference signal. The second node transmits back to the first node a second signal including a processing delay indicating the reception-to-transmission delay other than the RX/TX path delays. Based on the difference in transmission and reception timings at the first node and the known delays, a transmission delay offset is calculated. When applied by the second radio network node, the transmission delay offset results in time-aligned transmissions between the first and second radio network nodes. The same timestamps and delays are used to reference measured timing of at least some events at the second radio network node to the time domain of the first radio network node. A reception delay offset is then calculated. When applied by the second radio network node, the reception delay offset results in time-aligned reception between the first and second radio network nodes. In general, the transmission and reception delay offsets are different. The derived propagation delay is also useful for highly accurate round trip time (RTT) measurements, such as to calculate distance between the nodes.

One embodiment relates to a method of deriving a propagation delay of radio signals transmitted between a first radio network node and a second radio network node operative in a wireless communication system. A total calibrated delay, equal to the sum of a calibrated receiver delay and a calibrated transmitter delay, is obtained for each of the first and second radio network nodes. A first signal is transmitted from the first radio network node to the second radio network node, and a first timestamp indicating the time of transmission of the first signal is saved. A second signal, including a processing delay of the second radio network node, is received at the first radio network node from the second radio network node, and a second timestamp indicating the time of reception of the second signal is saved. A propagation delay between the first and second radio network nodes is derived based on the difference between the first and second timestamps and the obtained delays.

Another embodiment relates to a first radio network node operative in a wireless communication system and operative to derive a propagation delay of radio signals transmitted between the first node and a second radio network node operative in the wireless communication system. The first radio network node includes at least three antennas, receiver circuitry connected to the antennas and having a receiver path delay, transmitter circuitry connected to the antennas and having a transmitter path delay, and processing circuitry operatively connected to the receiver and transmitter circuitry. The processing circuitry is configured to: obtain a total calibrated delay equal to the sum of a calibrated receiver delay and a calibrated transmitter delay, for each of the first and second radio network nodes; transmit, from the first radio network node to the second radio network node, a first signal and save a first timestamp indicating the time of transmission of the first signal; receive, at the first radio network node from the second radio network node, a second signal including a processing delay of the second radio network node, and save a second timestamp indicating the time of reception of the second signal; and derive a propagation delay between the first and second radio network nodes based on the difference between the first and second timestamps and the obtained delays.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The synchronization procedures of embodiments of the present invention are applicable between any two radio network nodes, which assume master and slave roles in the procedures. The assignment of master and slave roles is arbitrary. In a multihop scenario, a radio network node can be a slave in the calibration of the first hop, and the master in the calibration of the next hop. In general, a radio network node may be a base station—a fixed network node (e.g., a eNB or gNB) providing service to a plurality of terminals within a geographic area, called a cell or sector. Alternatively, a radio network node may be a UE or a Machine Type Communications (MTC) device, such as a Machine-to- Machine (M2M) or Internet of Things (IoT) device, which may be fixed or mobile. Further, a radio network node may be associated with a different network, such as a UE communicating with a WLAN (e.g., Wi-Fi) Access Point. Accordingly, the synchronization procedures of embodiments of the present invention may be performed between two base stations, between two UEs, between a base station and a UE, between a UE and an AP, or any other combination. For ease of explanation only, embodiments of the present invention are described herein with reference to base stations. Those of skill in the art will readily recognize that this in no way limits the present invention, and those of skill in the art may readily apply the teachings herein to synchronization between any two radio network nodes.

Figure 1:
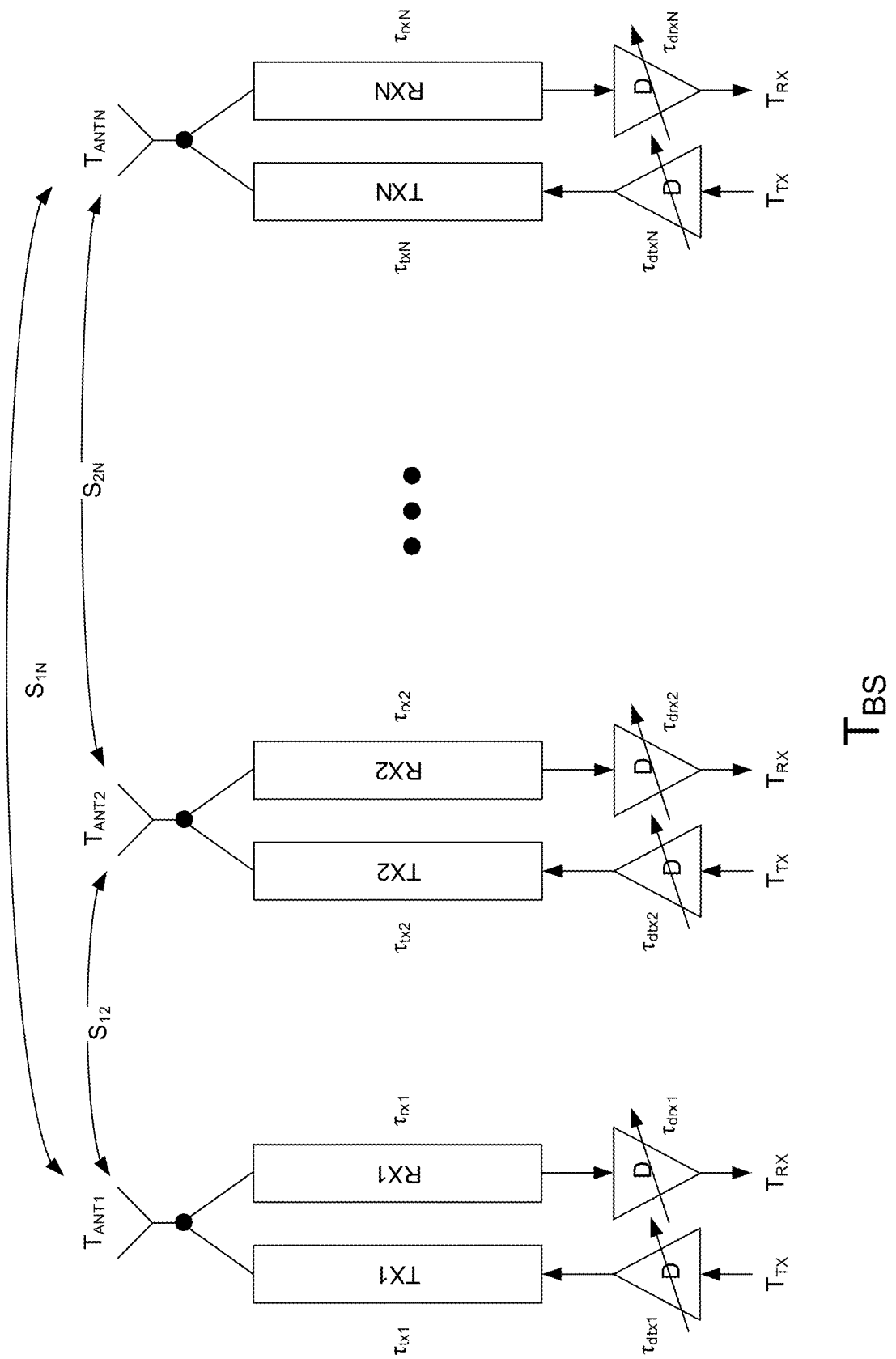
FIG. 1 is a block diagram of antennas, path delays, and programmable delays at a radio network node.

The first step of the synchronization procedure—calibration at each radio base station—is explained with reference to FIG. 1. FIG. 1 depicts a representative base station, with N antennas. Each antenna has a receiver path, having a characteristic delay $\tau_{rxn}$, and a transmitter path, having an unrelated characteristic delay $\tau_{txn}$. In general, the receiver path delay and transmitter path delay of each antenna may be different. The base station has an overall timing reference $T_{BS}$. The timing reference $T_{BS}$ may be derived from a reference timing, such as that deployed by a Global Navigation Satellite System (GNSS). However, because the timing synchronization described here occurs between two base stations, no absolute timing is required. The first base station timing reference $T_{BS}$ may be derived from an external stable and accurate source, such as a temperature compensated crystal oscillator (TCXO), oven-controlled crystal oscillator (OCXO), or the like.

Throughout the present disclosure, the variable T represents a discrete time, such as the time of receipt of a signal at a defined point in the base station (e.g., by processing circuitry). A time T may be represented by a timestamp having the appropriate resolution. The variable $\tau$ represents a delay. Subscripts are used with both T and $\tau$ to indicate transmitter or receiver, antenna number, which base station, which time reference, and the like. Delays $\tau$ may be fixed or variable. For convenience, delays are referred to herein as time domain durations. However, variable delays and delay offsets may be implemented as phase shifts or phase rotations.

Referring to FIG. 1, $T_{TX}$ and $T_{RX}$ are strobes marking the beginning of data transmission and data reception, respectively. The strobes are the same for all antennas and have a known accurate timing relation to each other. The strobes need not occur at the same time, but must have a static timing relationship. That is, there could be an unknown timing error relative to $T_{BS}$ depending on the application, but the timing relation must be stable, with limited drift between calibration events. This is assured by the internal design needed for beamforming systems with accurate and stable frequencies and timing strobes.

The path delays through the transmitter and receiver paths are denoted $\tau_{tx1}, \tau_{tx2}, \ldots, \tau_{txN}$ and $\tau_{rx1}, \tau_{rx2}, \ldots, \tau_{rxN}$, respectively. These include both analog and digital delays through the transmitter and receiver circuits (e.g., filters, amplifiers, (de)modulators, and the like), and will be variable and frequency dependent. Programmable delay circuits add programmable delays, $\tau_{dtx1}, \tau_{dtx2}, \ldots, \tau_{dtxN}$ and $\tau_{drx1}, \tau_{drx2}, \ldots, \tau_{drxN}$, to the path delays, to compensate delay variations between transmitters and between receivers. Delay compensation can either be done by a frequency dependent phase rotation of the signal or by true time delay circuitry, or a combination of both solutions.

$S_{12}$, $S_{1N}$ and $S_{2N}$ represent coupling between the antennas at the base station. These are symmetric and geometry dependent. They can be measured separately (only once for each BS type, since they are only geometry dependent) and compensated for in the calibration process. In many cases the antennas are tightly placed, and the impact on the delay calibration accuracy is small and can be neglected.

The objective of the calibration step is to make the delay through each transmitter path the same, and the delay through each receiver path the same. This is accomplished, after measurements and calculations, by adjusting the programmable delays $\tau_{dtx1}, \tau_{dtx2}, \ldots, \tau_{dtxN}$ and $\tau_{drx1}, \tau_{drx2}, \ldots, \tau_{drxN}$.

The preceding description is generalized and simplified. In practice, the programmable delay values may be determined in a number of ways. As mentioned, the delay adjustments may be made as frequency dependent phase rotations.

Figure 2:
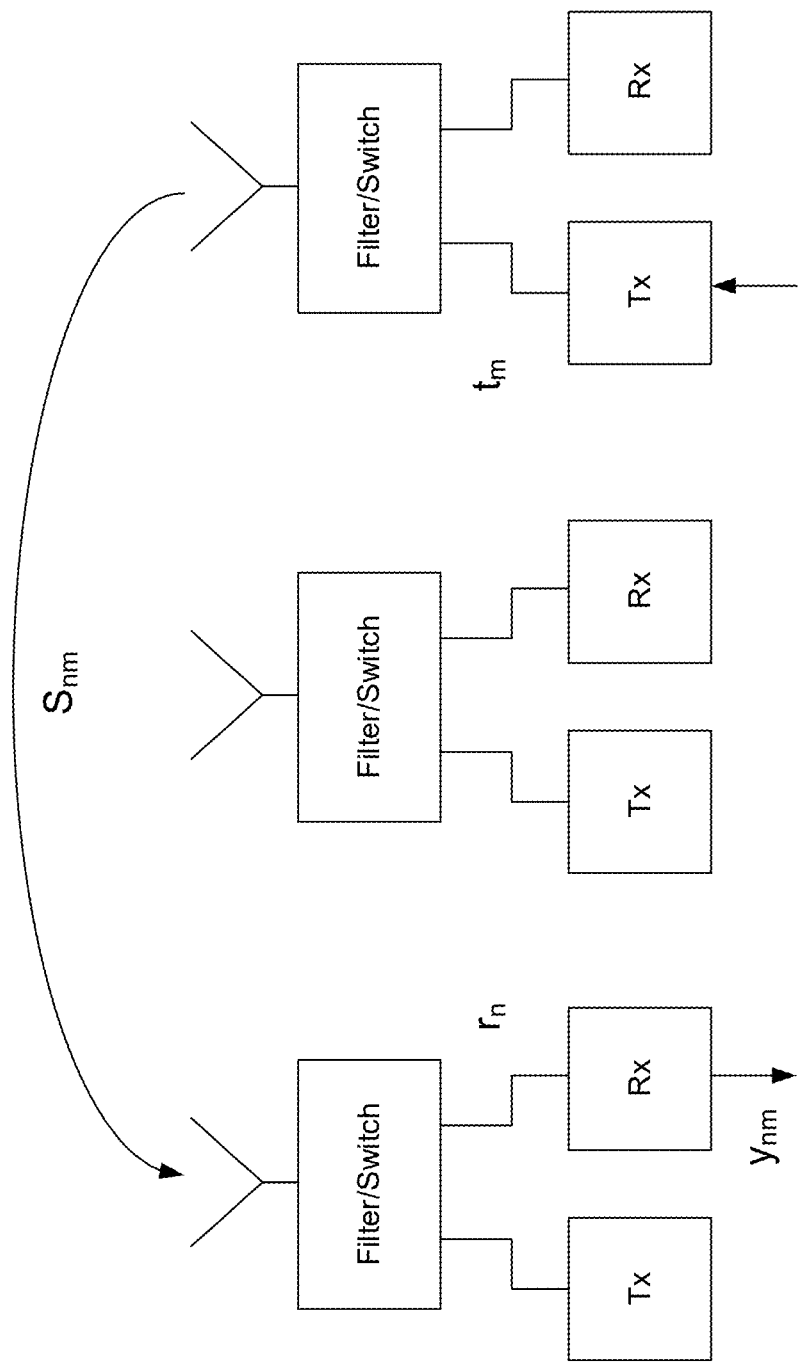
FIG. 2 is a block diagram showing the system equation components for calibration at a radio network node.

One representative method of implementing the calibration step described above is explained with reference to FIG. 2. FIG. 2 presents a system model for the calibration of antennas at one selected frequency. Calibration is performed over the full operational bandwidth of the base station; however the actual calibration algorithm is applied per frequency. The delays as presented in FIG. 1 can, at each frequency, be considered as a frequency dependent complex scaling factor. Referring to FIG. 2, $S_{nm}$=complex known coupling factor between port m and n;

$r_n$=complex unknown scaling factor for receiver n;

$t_m$=complex unknown scaling factor for transmitter m; and $y_{nm}$=received signal at receiver port n when transmitted as a normalized signal (=1) at transmitter port m.

The system model is $y=Y(\theta)+w$ where y, Y, and w are vectors, and $\theta$ is the set of unknowns to be estimated. y is the data vector, Y is the system equation, and w is noise. The vector length is the number of equations. All values are complex numbers representing one frequency. The calibration process is repeated over a relevant number of frequencies for the full radio bandwidth. Two unknowns are associated with each antenna: receive path delay (r below) and transmit path delay (t). At least the same number of measurements as there are unknowns is required. This imposes a lower bound of three antennas (six measurements and six unknowns).

A component of Y is $Y_k=Y_{nm}=r_n S_{nm} t_m$ if measurement k corresponds to transmitting with port m and receiving with port n. $\theta=[rt]^T$ is the vector of unknowns to be estimated. Assuming N antennas, there are 2N unknowns per frequency. However, there is an ambiguity in the solution—absolute values cannot be estimated because a common unknown scaling factor remains. One way to solve this equation is to set one path as a reference, and align all other paths to the reference path. This is a non-linear equation system.

The Maximum Likelihood (ML) algorithm can be considered as a reference algorithm, since it asymptotically attains the Cramer Rao Lower Boundary (CRLB). One convenient implementation uses the Expectation-Maximization (EM) scheme Space-Alternating Generalized EM (SAGE). The process is an iterative one:

1. Assume an initial estimate $\hat{r}$
2. Estimate t from $y=Y(t;\hat{r})+w$ assuming $\hat{r}$ fixed
3. Estimate r from $y=Y(r;\hat{t})+w$ assuming $\hat{t}$ fixed Iterate steps 2 and 3 until they converge to a solution.

For ML-EM, this scheme is theoretically shown to converge to a local maximum of the likelihood function provided that the estimates in steps 2 and 3 are ML estimates. The ML problems in steps 2 and 3 are linear and separable, i.e., one independent problem for each $t_n$ in step 2 and for each $r_n$ in step 3 Thus, the ML solutions are well known.

Note that $y_{nm}$ is the measured complex number for one frequency when injecting a signal at port m and receiving at port n. There is no need to assume identical timing when injecting and receiving signals on different ports. Rather, it is sufficient to know that the timing for each port is stable, and relevant also when running in normal operation.

Delay compensation ($\tau_{dtxN}$, $\tau_{drxN}$ in FIG. 1) is calculated as a complex number per frequency. It can either be applied as a time-domain delay compensation, as indicated in FIG. 1, or applied as a frequency-dependent phase rotation. When applied, the delay compensation will phase-align all transmit signals at the antenna and all receive signals at the sampling point, if timing is stable. Hence, although described herein as time delays, those of skill in the art will note that all signal timing can be implemented as phase changes.

After the calibration process, including delay estimation and compensation, all internal transmitter and receiver paths at each base station will be aligned, and hence the transmitter delays are calibrated and the receiver delays are calibrated. The $y_{nm}$ measurements at different frequencies are used to estimate a total calibrated delay $\tau_{trx} = \tau_{tx} + \tau_{rx}$ valid for all transceiver paths at the radio network node.

The calibrated delay from $T_{TX}$ to $T_{ANT}$ is denoted $\tau_{tx}$ and from $T_{ANT}$ to $T_{RX}$ is $\tau_{rx}$. The absolute values of $\tau_{tx}$ and $\tau_{rx}$ are still unknown, but there is an accurate measurement of the total calibrated delay $\tau_{trx} = \tau_{tx} + \tau_{rx}$. This concludes the calibration process, which is step one of the two-step antenna synchronization procedure. Note that in an active-antenna system with beamforming, this calibration step is required, to ensure all antennas have a known phase and amplitude relation.

Figure 3:
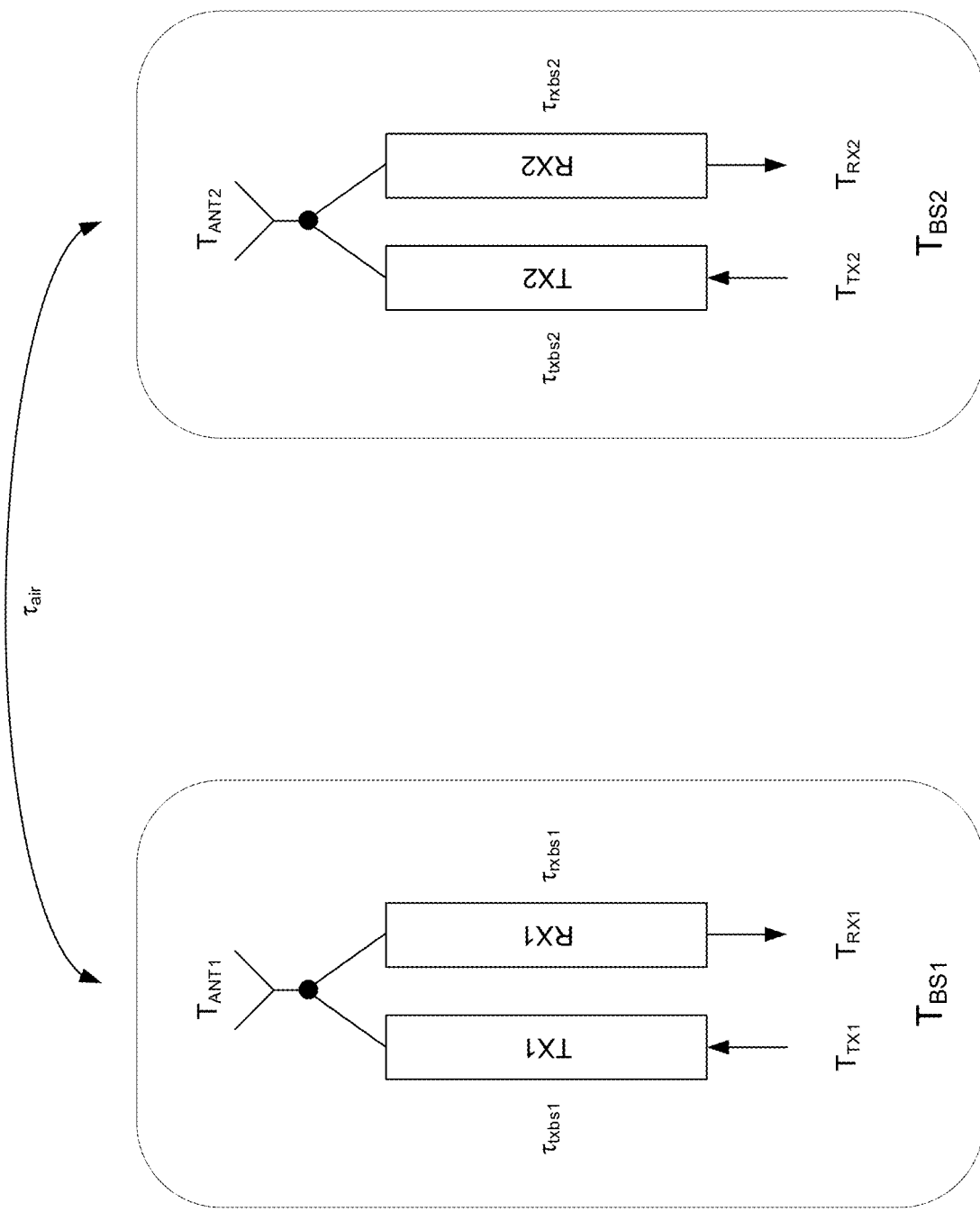
FIG. 3 is a simplified block diagram of antennas and path delays at two base stations.

FIG. 3 depicts the model for the second step of the antenna synchronization procedure. This step proceeds in a pair-wise manner, with one base station BS1 assuming the role of master and BS2 being a slave—that is, the base station BS2 will align its transmission and reception timing to match that of BS1. For simplification, the model in FIG. 3 depicts only one antenna at each base station, and only one transmitter path and one receiver path. Because both base stations have completed the calibration procedure, it is known that the path delays $\tau_{tx}$ of all transmitter paths are equal, as are all of the receiver path delays $\tau_{rx}$. Although these individual delays are not known, the calibration process has yielded a total reception-to-transmission delay $\tau_{trx} = \tau_{tx} + \tau_{rx}$ for each base station.

The master base station BS1 initiates the calibration procedure by sending a first signal to BS2. BS1 saves a timestamp $T_{TX1}$, which is the transmission time of the first signal. BS2 receives the first signal and immediately sends a second signal back to BS1, after processing delay $T_{TX2} - T_{RX2} = \tau_{rx2tx2}$, the value of which is also sent back to BS1. BS1 receives this second signal at time:

$$T_{RX1} = T_{TX1} + \tau_{txbs1} + \tau_{air} + \tau_{rxbs2} + \tau_{rx2tx2} + \tau_{txbs2} + \tau_{air} + \tau_{rxbs1}$$

and records this time in a second timestamp $T_{RX1}$. Therefore, the elapsed time from transmission to reception at BS1 (the difference between the second and first timestamps) is:

$$T_{RX1} - T_{TX1} = (\tau_{txbs1} + \tau_{rxbs1}) + (\tau_{txbs2} + \tau_{rxbs2}) + 2\tau_{air} + \tau_{rx2tx2} \quad (1)$$

All of the values in equation (1) are known except the RF propagation time $\tau_{air}$, which can be derived. For Line-of-Sight (LOS) RF conditions, the physical distance between the nodes' antennas is directly derived from $\tau_{air}$, as $d = c\tau_{air}$ where c is the speed of light. Since the derivation of $\tau_{air}$ excludes errors related to internal delays at each of the nodes, which normally limits its accuracy, the derivation of $\tau_{air}$ according to embodiments of the present invention is particularly suited for enhanced Round Trip Time (RTT) based ranging between two nodes.

The first signal from BS1 arrives at BS2 at time:

$$T_{RX2} = T_{TX1} + \tau_{txbs1} + \tau_{air} + \tau_{rxbs2} \quad (2)$$

Here, there is an unknown delay of $\tau_{txbs1} + \tau_{rxbs2}$. However, the goal is to synchronize transmit and receive timing at the antenna port. Considering the transmission from BS2 of the second signal, with a transmission delay offset of $\delta\tau_{rx2tx2}$, the timing at each antenna is:

$$T_{ANT1,TX} = T_{TX1} + \tau_{txbs1} \quad (3)$$

$$T_{ANT2,TX} = T_{TX1} + \tau_{txbs1} + \tau_{air} + \tau_{rxbs2} + \delta\tau_{rx2tx2} + \tau_{txbx2} \quad (4)$$

The difference in antenna timing is:

$$T_{ANT2,TX} - T_{ANT1,TX} = \tau_{air} + \tau_{rxbs2} + \delta\tau_{rx2tx2} + \tau_{txbs2} \quad (5)$$

Thus, by setting the transmission delay offset at BS2 to $\delta\tau_{rx2tx2} = -\tau_{air} - (\tau_{rxbs2} + \tau_{txbs2})$, then transmissions between BS1 and BS2 are time-aligned at the antennas. Everything here is known from previous measurements.

Next, an offset is derived for measured receive antenna timing at BS2 to align it with the measured receive antenna timing at BS1. This relationship is initially established by the first signal discussed above—that is, sending a signal from BS1 to BS2, with BS1 saving a timestamp indicating the time of its transmission from BS1. As derived above, this results in the timing relationship:

$$T_{RX2} = T_{TX1} + \tau_{txbs1} + \tau_{air} + \tau_{rxbs2}$$

Note, however, that BS1 operates in the time base for the first base station $T_{BS1}$, and BS2 operates in time base $T_{BS2}$. Rewriting the above equation more generally to reflect the base stations' timing relationship, $$T_{BS2} = T_{BS1} + \tau_{txbs1} + \tau_{air} + \tau_{rxbs2} \quad (6)$$

That is, due to the signal propagation delay and path delays at both base stations, the timing at BS2 is behind (later than) the timing at BS1. A common signal (e.g., a signal broadcast from another base station), received at both base station antennas at the same time would generate two measured receive times: $\tau_{Rx1, BS1\text{-}time}$ and $\tau_{Rx2, BS2\text{-}time}$ in the respective time bases $T_{BS1}$ and $T_{BS2}$. To synchronize the antenna timings, both are referenced to the $T_{BS1}$ timing. This means that an offset must be added to $\tau_{Rx2, BS2\text{-}time}$.

$$T_{RX2,BS1\text{-}time} = T_{RX2,BS2\text{-}time} + \tau_{rxbs1} + \tau_{air} + \tau_{rxbs2} \quad (7)$$

The respective antenna timings are derived (in $T_{BS1}$):

$$T_{ANT2,RX} = T_{RX2,BS1\text{-}time} - \tau_{rxbs2}$$

substituting the value for $T_{RX2, BS1\text{-}time}$ from equation (7):

$$T_{ANT2,RX} = [T_{RX2,BS2\text{-}time} + \tau_{txbs1} + \tau_{air} + \tau_{rxbs2}] - \tau_{rxbs2} = T_{RX2,BS2\text{-}time} + \tau_{txbs1} + \tau_{air} \quad (8)$$

$$T_{ANT1,RX} = T_{RX1,BS1\text{-}time} - \tau_{rxbs1} \quad (9)$$

The difference in measured antenna receive timing is:

$$T_{ANT2,RX} - T_{ANT1,RX} = T_{RX2,BS2-time} + \tau_{txbs1} + \tau_{air} - T_{RX1,BS1-time} + \tau_{rxbs1} \quad (10)$$

$$= T_{RX2,BS2-time} - T_{RX1,BS1-time} + \tau_{air} + (\tau_{rxbs1} + \tau_{txbs1})$$

Hence, the measured receive time difference should be offset by $\tau_{air}+(\tau_{rxbs1}+\tau_{txbs1})$ to obtain the actual antenna timing difference. All of these values are known. Note that the required offset differs between transmission and reception.

This second step of the antenna synchronization process (for both transmission and reception) may then be repeated for a plurality of frequencies across the base stations' bandwidth. Alternatively, the first and second timing signals exchanged between BS1 and BS2 may be high bandwidth signals. The entire process is then repeated for a different pair of base stations (of course, each base station is only required to perform the calibration step once). In a repeater scenario, a first base station may be a master and align the antenna timing of a second base station as the slave. The second base station then assumes the master role, and aligns the timing of a third base station, acting as a slave. The end-to-end alignment is then the sum of the offsets calculated for the second and third base stations.

Figure 4:
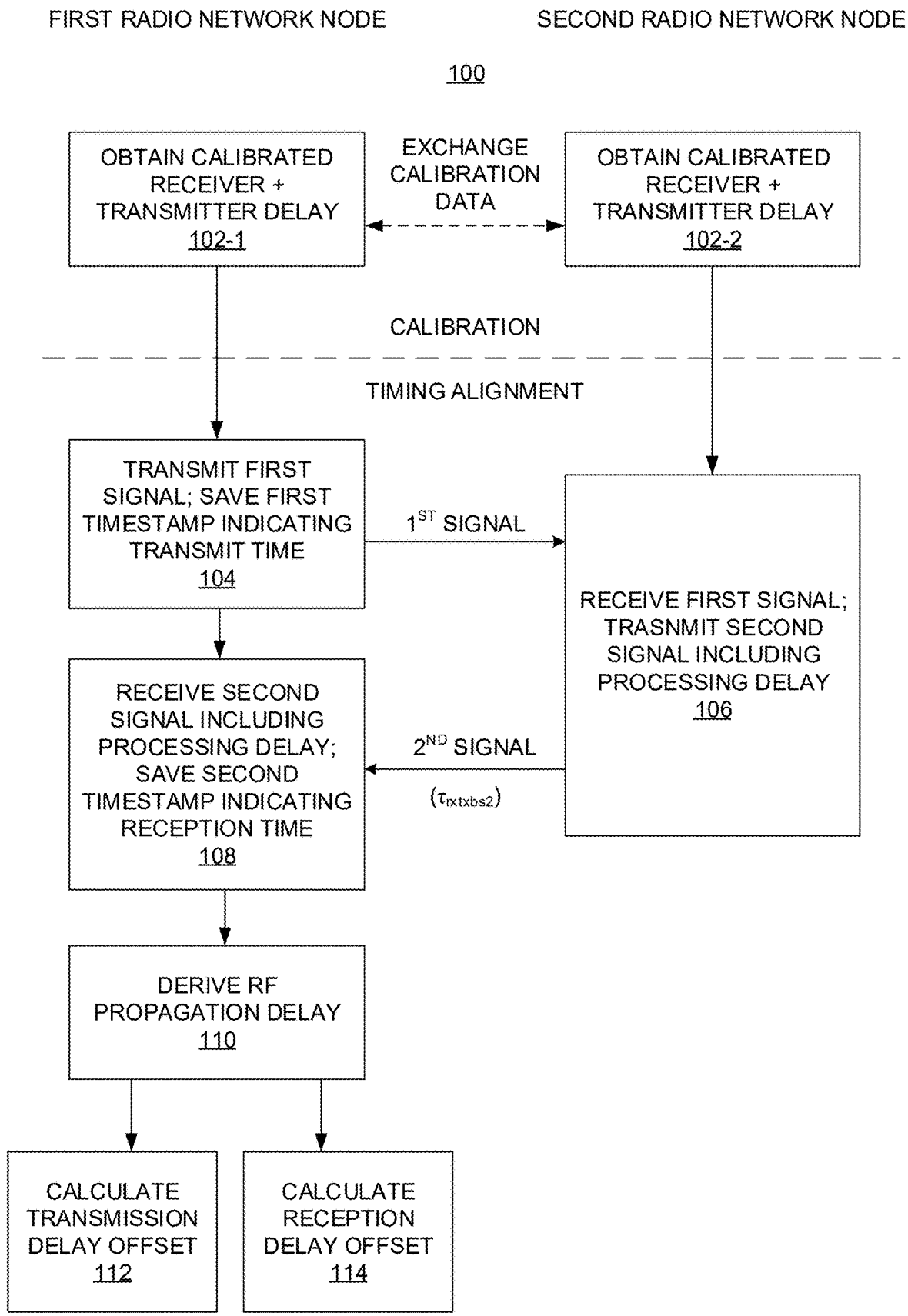
FIG. 4 is a flow diagram of a method of synchronizing transmitter antenna timing between first and second radio network nodes.

FIG. 4 depicts some steps in a method 100 of deriving a propagation delay of radio signals transmitted between a first radio network node and a second radio network node operative in a wireless communication system, and using the propagation delay to synchronize antenna timings between the two nodes. For completeness, FIG. 4 depicts both steps described above—that is, a calibration step and a timing alignment step. Typically, the calibration step would be performed only once (or infrequently) at each node.

In the calibration step, at both the first and second radio network nodes, a total calibrated delay, equal to the sum of a calibrated receiver delay and a calibrated transmitter delay, is obtained (blocks 102-1, 102-2). Initially, these calibrated delays are obtained by performing a calibration procedure. The first and second radio network nodes may each perform their respective calibration procedures at different times. The first and second radio network nodes may store the results of the calibration, and may transmit the results to each other, or to a third network node for storage and retrieval. Upon subsequent antenna timing alignment procedures, the calibration results may be obtained by reading them from memory, or by retrieving them from another network node.

In a transmission antenna timing alignment step, the first radio network node transmits a first signal to the second radio network node (block 104). The first radio network node saves a timestamp representing the time $T_{TX1}$ at which the first signal is transmitted from the first radio network node. The second radio network node receives the first signal, and transmits a second signal, including a processing delay $T_{TX2}-T_{RX2}=\tau_{rx2tx2}$ of the second radio network node, back to the first radio network node (block 106). The processing delay $\tau_{rx2tx2}$ may be a relative derived/measured timing offset (generally based on a common timing reference at this point creating good relative timing accuracy). The first radio network node receives the second signal including the processing delay, and stores a second timestamp representing the time $T_{RX1}$ at which the second signal is received from the second radio network node (block 108).

Based on the first and second timestamps, and the obtained and received delays, the first radio network node calculates the RF propagation delay $\tau_{air}$ of the air interface between the first and second radio network nodes (block 110). The RF propagation delay $\tau_{air}$ may be used for a variety of tasks, such as accurate RTT calculations. The RF propagation delay $\tau_{air}$ may also be used by the first radio network node, along with the other timestamps and delays, to calculate a transmission delay offset $\delta\tau_{rx2tx2}$ at the second radio network node that results in time-aligned transmissions between the first and second radio network nodes (block 112). The first radio network node (or other node) may also use the timestamps and delays discussed above to calculate a reception delay offset for the second radio network node, which results in receive timing between the first and second radio network nodes being time-aligned (in the time domain of the first radio network node) (block 114). As indicated in FIG. 4, and regardless of the numbering of the blocks, the transmission and reception delay offsets may be calculated independently, and in any order, or only one of the two may be calculated. The first radio network node may transmit the transmission and/or reception delay offsets to the second radio network node, and/or to another network node.

Those of skill in the art will readily recognize that, although certain calculations, such as the transmission and/or reception delay offsets, have been depicted as being performed by, e.g., the first radio network node, either node—or a third node in the network—could perform the calculations, assuming the nodes exchange the relevant timestamps and delays.

As mentioned above, a radio network node may comprise a UE, a Base Station, an Access Point, or any other network node that communicates with other nodes by RF signals transmitted and received via antennas. FIG. 5A depicts a radio network node implemented as User Equipment (UE) 30 operative in a wireless communication network. As used herein, the term UE may refer to a user-operated telephony terminal, a machine-to-machine (M2M) device, a machine-type communications (MTC) device, a Narrowband Internet of Things (NB-IoT) device (in particular a UE implementing the 3GPP standard for NB-IoT), etc. A UE 30 may also be referred to as a radio device, a radio communication device, a wireless communication device, a wireless terminal, or simply a terminal—unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smartphones, laptop-embedded equipped (LEE), laptop-mounted equipment (LME), USB dongles, wireless customer-premises equipment (CPE), and the like.

The UE 30 transmits and receives RF signals (including MIMO and beamformed signals) on at least one antenna 32, which may be internal or external, as indicated by dashed lines. The RF signals are generated, and received, by one or more transceiver circuits 34. The transceiver circuits 34, as well as other components of the UE 30, are controlled by processing circuitry 36. Memory 38 operatively connected to the processing circuitry 36 stores software in the form of computer instructions operative to cause the processing circuitry 36 to execute the methods 100, 200 described herein. A user interface 40 may include output devices such as a display and speakers (and/or a wired or wireless connection to audio devices such as ear buds), and/or input devices such as buttons, a keypad, a touchscreen, and the like. As indicated by the dashed lines, the user interface 40 may not be present in all UEs 30; for example, UEs 30 designed for Machine Type Communications (MTC) such as Internet of Things (IoT) devices, may perform dedicated functions such as sensing/measuring, monitoring, meter reading, and the like, and may not have any user interface 40 features.

Figure 5B:
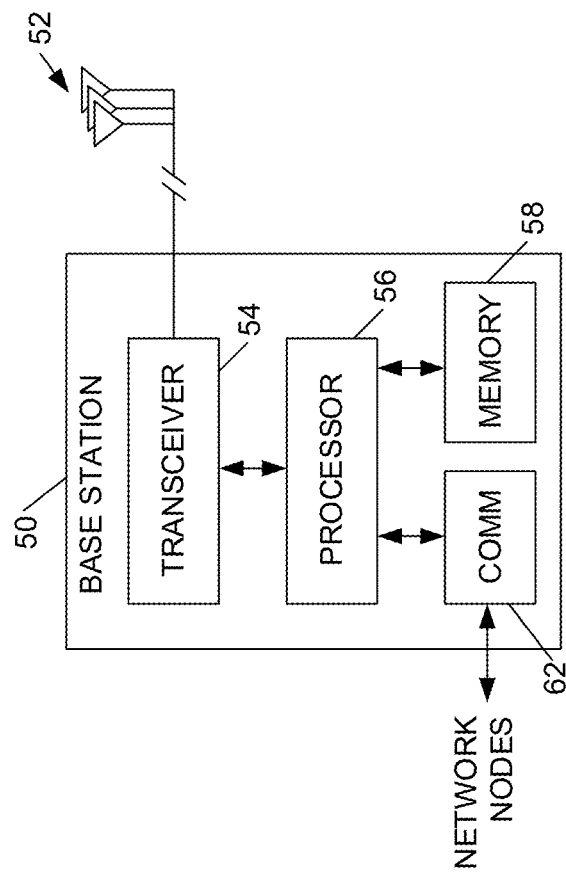
FIG. 5B is a block diagram of a radio network node implementing a base station.
Figure 5A:
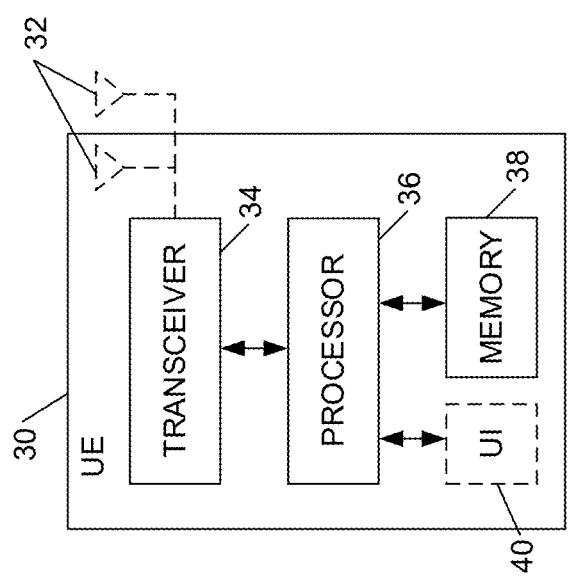
FIG. 5A is a block diagram of a radio network node implementing a UE.

FIG. 5B depicts a radio network node implemented as base station 50 operative in a wireless communication network. A base station 50—known in various network implementations as a Radio Base Station (RBS), Base Transceiver Station (BTS), Node B (NB), enhanced Node B (eNB), Next Generation Node B (gNB), or the like—is a node of a wireless communication network that implements a Radio Access Network (RAN) in a defined geographic area called a cell or sector, by providing radio transceivers to communicate wirelessly with a plurality of UEs 30.

The base station 50 transmits and receives RF signals (including MIMO signals) on a plurality of antennas 52. As indicated by the broken line, the antennas 52 may be located remotely from the base station 50, such as on a tower or building. The RF signals are generated, and received, by one or more transceiver circuits 54. The transceiver circuits 54, as well as other components of the base station 50, are controlled by processing circuitry 56. Memory 58 operatively connected to the processing circuitry 56 stores instructions operative to cause the processing circuitry 56 to execute the methods 100, 200 described herein. Although the memory 58 is depicted as being separate from the processing circuitry 56, those of skill in the art understand that the processing circuitry 56 includes internal memory, such as a cache memory or register file. Those of skill in the art additionally understand that virtualization techniques allow some functions nominally executed by the processing circuitry 56 to actually be executed by other hardware, perhaps remotely located (e.g., in the so-called "cloud"). Communication circuitry 62 provides one or more communication links to one or more other network nodes, propagating communications to and from UEs 30, from and to other network nodes or other networks, such as telephony networks or the Internet. In some embodiments, the transceiver circuitry 54 may implement the backhaul, such as according to the IAB protocol.

In all embodiments, the processing circuitry 36, 56 may comprise any sequential state machine operative to execute machine instructions stored as machine-readable computer programs in memory 38, 58, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 38, 58 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the transceiver circuits 34, 54 are operative to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, Bluetooth, or the like. The transceiver 34, 54 implements transmitter and receiver functionality appropriate to the RAN links (e.g., frequency allocations and the like). The transmitter and receiver functions may share circuit components and/or software, or alternatively may be implemented separately.

In all embodiments, the communication circuitry 62 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 62 implement receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. Embodiments of the present invention rely on multiple antennas at a radio network node being calibrated, such that a calibrated receiver delay of all antennas are equal, and a calibrated transmitter delay of all antennas are equal. Although these values are not known, their sum—a total calibrated delay—is determined and stored by each radio network node. This procedure is required for any active antenna system that performs beamforming. Embodiments of the present invention provide a method of separately aligning transmit and receive antenna timing, in pair-wise fashion between any two radio network nodes. The alignment procedures result in a transmission delay offset and a reception delay offset, respectively, to be applied at the slave node for time alignment at the antennas between the two nodes. These procedures utilize OTA transmissions as timing sources, and hence do not require any external timing reference, so long as local timing is stable. The antenna timing alignment resulting from embodiments of the present invention enable numerous services in wireless communication networks, such as AAS (including beamforming and MIMO), IAB, soft handoff, and accurate radio network node positioning in urban and indoor environments with poor positioning satellite coverage.

As used herein, the term "timestamp" means a data structure including information identifying the time at which an event occurred, referenced to some temporal standard or domain. The event may, for example, be the reception or transmission of a signal. The event may be the transmission of a signal which includes a timestamp that records the time of that transmission—that is, a timestamp may record the time of its own transmission (with reference to the time base of the transmitting node). As used herein, the term "configured to" means set up, organized, adapted, or arranged to operate in a particular way; the term is synonymous with "designed to." As used herein, when referring to transmitter or receiver antenna timing, the terms "synchronize" and "align" or "time-align" are synonymous.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of deriving a propagation delay of radio signals transmitted between a first radio network node having a first plurality of antenna elements and a second radio network node having a second plurality of antenna elements, both nodes being operative in a wireless communication system, comprising:
   obtaining a total calibrated delay equal to the sum of a calibrated receiver delay and a calibrated transmitter delay, for each of the first and second radio network nodes, the total calibrated delay being based on results of calibration processes that substantially equalize delays through transmitter paths to and including each antenna element, and delays through receiver paths from and including each antenna element, at each of the first and second radio network nodes;
   transmitting, from the first radio network node to the second radio network node, a first signal and saving a first timestamp indicating the time of transmission of the first signal;
   receiving, at the first radio network node from the second radio network node, a second signal including a processing delay of the second radio network node, and saving a second timestamp indicating the time of reception of the second signal; and
   deriving a propagation delay between the first and second radio network nodes based on the difference between the first and second timestamps and the obtained delays.

2. The method of claim 1 further comprising:
   based on the timestamps and delays, calculating a transmission delay offset at the second radio network node that results in time-aligned transmissions between the first and second radio network nodes.

3. The method of claim 2 wherein the transmission delay offset at the second radio network node that results in time-aligned transmissions between the first and second radio network nodes is $\delta\tau_{rx2tx2} = -\tau_{air} - (\tau_{rxbs2} + \tau_{txbs2})$ where
   $\tau_{air}$ is the RF propagation delay between the first and second radio network nodes;
   $\tau_{rxbs2}$ is the calibrated path delay of transmitter paths at the second radio network node;
   $\tau_{txbs2}$ is the calibrated path delay of receiver paths at the second radio network node; and
   $(\tau_{rxbs2} + \tau_{txbs2})$ is the total calibrated delay for the second radio network node.

4. The method of claim 1 further comprising:
   based on the timestamps and delays, calculating a reception delay offset at the second radio network node that results in time-aligned receptions at the first and second radio network nodes.

5. The method of claim 4 wherein the reception delay offset at the second radio network node that results in time-aligned receptions at the first and second radio network nodes is $\tau_{air} + (\tau_{rxbs1} + \tau_{txbs1})$ where
   $\tau_{air}$ is the RF propagation delay between the first and second radio network nodes;
   $\tau_{rxbs1}$ is the calibrated path delay of transmitter paths at the first radio network node
   $\tau_{txbs1}$ is the calibrated path delay of receiver paths at the first radio network node; and
   $(\tau_{rxbs1} + \tau_{txbs1})$ is the total calibrated delay for the first radio network node.

6. The method of claim 1 further comprising:
   based on the propagation delay, calculating a distance between the first and second radio network nodes using Round Trip Timing, RTT, techniques.

7. The method of claim 1, wherein obtaining the total calibrated delay of the first radio network node comprises reading the total calibrated delay from memory.

8. The method of claim 1, wherein obtaining the total calibrated delay of the first radio network node comprises performing a calibration procedure at the first radio network node comprising:
   measuring pair-wise couplings between at least three antennas of the first radio network node;
   for each antenna of the first radio network node,
      measuring a delay in each of receiver and transmitter paths; and
      determining a programmable receiver delay such that a calibrated receiver delay, comprising the sum of the receiver path delay and the programmable receiver delay, is the same for every antenna; and
      determining a programmable transmitter delay such that a calibrated transmitter delay, comprising the sum of the transmitter path delay and the programmable transmitter delay, is the same for every antenna; and
   measuring a total calibrated delay equal to the sum of the calibrated receiver delay and the calibrated transmitter delay.

9. The method of claim 8 wherein the antenna couplings are symmetric and depend only on the geometry of the antenna locations.

10. The method of claim 9 wherein
    the receiver and transmitter path delays are frequency dependent; and
    the measurements and determinations for each antenna of the first radio network node, and the total calibrated delay measurement, are repeated at two or more frequencies over a bandwidth of the first radio network node.

11. The method of claim 9 wherein determining the programmable delays comprises using a Maximum Likelihood algorithm.

12. The method of claim 11 wherein the Maximum Likelihood algorithm is a Space-Alternating Generalized Expectation-Maximization algorithm.

13. A first radio network node having a first plurality of antenna elements and operative in a wireless communication system and operative to derive a propagation delay of radio signals transmitted between the first node and a second radio network node having a second plurality of antenna elements and operative in the wireless communication system, comprising:
    at least three antennas;
    receiver circuitry connected to the antennas and having a receiver path delay;
    transmitter circuitry connected to the antennas and having a transmitter path delay;
    processing circuitry operatively connected to the receiver and transmitter circuitry, the processing circuitry configured to:
       obtain a total calibrated delay equal to the sum of a calibrated receiver delay and a calibrated transmitter delay, for each of the first and second radio network nodes, the total calibrated delay being based on results of calibration processes that substantially equalize delays through transmitter paths to and including each antenna element, and delays through receiver paths from and including each antenna element, at each of the first and second radio network nodes;

transmit, from the first radio network node to the second radio network node, a first signal and save a first timestamp indicating the time of transmission of the first signal;

receive, at the first radio network node from the second radio network node, a second signal including a processing delay of the second radio network node, and save a second timestamp indicating the time of reception of the second signal; and derive a propagation delay between the first and second radio network nodes based on the difference between the first and second timestamps and the obtained delays.

14. The first radio network node of claim 13 wherein the processing circuitry is further configured to:

based on the timestamps and delays, calculate a transmission delay offset at the second radio network node that results in time-aligned transmissions between the first and second radio network nodes.

15. The first radio network node of claim 14 wherein the transmission delay offset at the second radio network node that results in time-aligned transmissions between the first and second radio network nodes is $\delta\tau_{rx2tx2}=-\tau_{air}-(\tau_{rxbs2}+\tau_{txbs2})$ where $\tau_{air}$ is the RF propagation delay between the first and second radio network nodes;

$\tau_{rxbs2}$ is the calibrated path delay of transmitter paths at the second radio network node;

$\tau_{txbs2}$ is the calibrated path delay of receiver paths at the second radio network node; and $(\tau_{rxbs2}+\tau_{txbs2})$ is the total calibrated delay for the second radio network node.

16. The first radio network node of claim 13 wherein the processing circuitry is further configured to:

based on the timestamps and delays, derive a reception delay offset at the second radio network node that results in time-aligned receptions at the first and second radio network nodes.

17. The first radio network node of claim 16 wherein the reception delay offset at the second radio network node that results in time-aligned receptions at the first and second radio network nodes is $\tau_{air}+(\tau_{rxbs1}+\tau_{txbs1})$ where $\tau_{air}$ is the RF propagation delay between the first and second radio network nodes;

$\tau_{rxbs1}$ is the calibrated path delay of transmitter paths at the first radio network node $\tau_{txbs1}$ is the calibrated path delay of receiver paths at the first radio network node; and $(\tau_{rxbs1}+\tau_{txbs1})$ is the total calibrated delay for the first radio network node.

18. The first radio network node of claim 13 wherein the processing circuitry is further configured to based on the propagation delay, calculate a distance between the first and second radio network nodes using Round Trip Timing, RTT, techniques.

19. The first radio network node of claim 13 wherein the processing circuitry is configured to obtain the total calibrated delay of the first radio network node by reading the total calibrated delay from memory.

20. The first radio network node of claim 13, further comprising a programmable receiver delay circuit connected to the receiver circuitry and a programmable transmitter delay circuit connected to the transmitter circuitry, and wherein the processing circuitry is configured to obtain the total calibrated delay of the first radio network node by performing a calibration procedure at the first radio network node comprising:

measuring pair-wise coupling between antennas of the first radio network node;

for each antenna of the first radio network node,
  measuring a delay in each of receiver and transmitter paths; and
  determining a programmable receiver delay such that a calibrated receiver delay, comprising the sum of the receiver path delay and the programmable receiver delay, is the same for every antenna; and
  determining a programmable transmitter delay such that a calibrated transmitter delay, comprising the sum of the transmitter path delay and the programmable transmitter delay, is the same for every antenna; and measuring a total calibrated delay equal to the sum of the calibrated receiver delay and the calibrated transmitter delay.

21. The first radio network node of claim 13 wherein the first radio network node comprises a base station.

22. The first radio network node of claim 13 wherein the first radio network node comprises User Equipment.

* * * * *